US008953694B2

(12) United States Patent
Inohiza et al.

(10) Patent No.: US 8,953,694 B2
(45) Date of Patent: Feb. 10, 2015

(54) COMMUNICATION APPARATUS AND CONTROL METHOD THEREFOR

(75) Inventors: Hirohiko Inohiza, Rennes (FR); Ichiro Kuwana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 13/255,478

(22) PCT Filed: Mar. 2, 2010

(86) PCT No.: PCT/JP2010/001406
§ 371 (c)(1),
(2), (4) Date: Sep. 8, 2011

(87) PCT Pub. No.: WO2010/103744
PCT Pub. Date: Sep. 16, 2010

(65) Prior Publication Data
US 2012/0002681 A1    Jan. 5, 2012

(30) Foreign Application Priority Data

Mar. 12, 2009   (JP) ................. 2009-059561

(51) Int. Cl.
*H04N 7/12* (2006.01)
*G01R 31/08* (2006.01)
(Continued)

(52) U.S. Cl.
CPC ............ *H04L 1/22* (2013.01); *H04L 1/0003* (2013.01); *Y02B 60/31* (2013.01)
USPC ...................... 375/240.27; 370/216

(58) Field of Classification Search
CPC ............... H01L 2012/2841; H01L 2007/00
USPC ........ 375/240.25, 240.01; 370/276, 294, 344, 370/328, 329, 341, 446, 449, 336, 337, 370/395.21, 395.4, 470, 472, 216, 217, 370/218; 455/450, 422.1, 445, 446, 449, 455/452.1, 452.2
See application file for complete search history.

(56) References Cited

U.S. PATENT DOCUMENTS 6,018,765 A * 1/2000 Durana et al. ................ 709/217
7,266,132 B1 * 9/2007 Liu et al. ...................... 370/538
(Continued)

FOREIGN PATENT DOCUMENTS

CN      1188355 A    7/1998
EP       881795 A2   12/1998
(Continued)

OTHER PUBLICATIONS

LG Electronics Inc. et al., "WirelessHD Specification Version 1.0 Overview" LG Electronics Inc., Oct. 2007, pp. 1-77.
(Continued)

*Primary Examiner* — Hanh N Nguyen
(74) *Attorney, Agent, or Firm* — Canon U.S.A., Inc. IP Division

(57) ABSTRACT

Regarding an apparatus capable of transmitting data using a high-rate transmission channel having narrow directivity and a low-rate transmission channel having wide directivity, data is not correctly sent in some cases because a communication path for the high-rate transmission channel is easily interrupted. In contrast, it is not possible to realize sending of high-quality data using the low-rate transmission channel. The same data is simultaneously transmitted using the high-rate transmission channel and the low-rate transmission channel. The data that has been received using the high-rate transmission channel or the data that has been received using the low-rate transmission channel is selected in accordance with a state of reception using the high-rate transmission channel.

11 Claims, 14 Drawing Sheets

(51) Int. Cl.
*H04L 1/22* (2006.01)
*H04L 1/00* (2006.01)

(56) References Cited

U.S. PATENT DOCUMENTS

| | | | |
|---|---|---|---|
| 7,925,269 B2* | 4/2011 | Shao et al. | 455/450 |
| 8,169,995 B2* | 5/2012 | Singh et al. | 370/349 |
| 8,306,060 B2* | 11/2012 | Ngo et al. | 370/473 |
| 2011/0317772 A1* | 12/2011 | Inohiza et al. | 375/240.25 |

FOREIGN PATENT DOCUMENTS

| | | |
|---|---|---|
| JP | 2-226928 A | 9/1990 |
| JP | 9-172643 A | 6/1997 |
| JP | 10-051380 A | 2/1998 |
| JP | 11-298954 A | 10/1999 |
| JP | 2000-004205 A | 1/2000 |
| JP | 2002-084261 A | 3/2002 |
| JP | 2005-026733 A | 1/2005 |
| JP | 2006-279550 A | 10/2006 |
| JP | 2007-36723 A | 2/2007 |
| JP | 2007-124632 A | 5/2007 |
| JP | 2008-072226 A | 3/2008 |

OTHER PUBLICATIONS

U.S. Appl. No. 13/255,481, filed Sep. 8, 2011, Hirohiko Inohiza.
WirelessHD Specification Version 1.0 Overview, Oct. 9, 2007.

* cited by examiner

Fig. 10

| PATH NUMBER 500 | RSSI LEVEL 505 | DIRECTIONAL ANGLE OF SENDING ANTENNA 510 | DIRECTIONAL ANGLE OF RECEIVING ANTENNA 515 | MODULATION SCHEME 520 | ENCODING RATE 525 |
|---|---|---|---|---|---|
| 0 | 10 | 90° | 90° | 16QAM | 1/2 |
| 1 | 7 | 45° | 135° | 8PSK | 2/3 |
| 2 | 6 | 135° | 45° | 8PSK | 2/3 | ns
COMMUNICATION APPARATUS AND CONTROL METHOD THEREFOR

TECHNICAL FIELD

The present invention relates to a communication technology for transmitting a data item such as a video data item.

BACKGROUND ART

As a technology for transmitting a video data item or an audio data item, a millimeter-wave wireless technology using a 60-GHz band, which can utilize a broad bandwidth and which can realize high-speed wireless transmission, has drawn attention. A millimeter wave has properties that are similar to those of light, and has a high rectilinear-propagation property. In millimeter-wave wireless communication, because of the characteristics of a millimeter wave, communication is easily interrupted when a shielding object such as a human crosses a communication path.

In a WirelessHD specification that is a standard specification of the millimeter-wave communication technology, an HRP (High Rate PHY) that is a high-rate transmission channel and an LRP (Low Rate PHY) that is a low-rate transmission channel are defined. Regarding the HRP, an antenna having narrow directivity is used. Accordingly, the direction of arrival of a millimeter wave associated with communication paths is limited, but a high gain can be obtained. The HRP is used to transmit a data item, such as an uncompressed video data item, at a high rate. On the other hand, regarding the LRP, the rate is low, and an antenna having wide directivity is used. Accordingly, when the LRP is compared with the HRP, the direction of arrival of a millimeter wave associated with communication paths is not limited, and a communication path is not easily interrupted. The LRP is used to transmit a compressed video data item, a control data item, and so forth. Furthermore, in WirelessHD, when interruption of a communication path is detected, a scheme is employed, in which switching to another communication path is performed by utilizing reflection of a millimeter wave at a wall or the like, and in which communication is restored.

As described above, in WirelessHD, proper use of the HRP and the LRP is realized by selecting either one of the channels, namely, the HRP and the LRP. Furthermore, when interruption of a communication path is detected, switching among communication paths is performed. In this manner, WirelessHD copes with the above-described problem of a millimeter wave.

CITATION LIST

Non Patent Literature

NPL 1: WirelessHD Specification Version 1.0 Overview (http://www.wirelesshd.org/pdfs/WirelessHD_Full_Overview_071009.pdf)

SUMMARY OF INVENTION

Technical Problem

However, when interruption of a communication path is detected while a video data item is being transmitted and switching among communication paths is performed as in the scheme employed in WirelessHD, instability occurs for a short moment during replaying of a video. Furthermore, typically, in order to perform an operation of switching among communication paths at a high rate, a communication path that is to be newly selected by the operation of switching among communication paths is searched in advance. However, when the state of a transmission path changes by a large degree, the communication path that is to be newly selected by the operation of switching among communication paths may become unavailable. In such a case, it is necessary to search an available path again, and video replay is stopped for a long time.

The present invention provides, when a data item is transmitted between communication apparatuses, the capability to reduce the occurrence of unstable or interrupted replaying of the data item.

Solution to Problem

In order to solve the above-described problems, the present invention provides, when communication of a predetermined data item is performed, communication in which the predetermined data item is simultaneously transmitted using a high-rate transmission channel and a low-rate transmission channel.

Advantageous Effects of Invention

According to the present invention, even when a communication path is interrupted, short interruption or stopping of replaying of a received data item can be reduced.

BRIEF DESCRIPTION OF DRAWINGS

FIG. 10 is a diagram of a configuration of a communication path table.

DESCRIPTION OF EMBODIMENT

Figure 1:
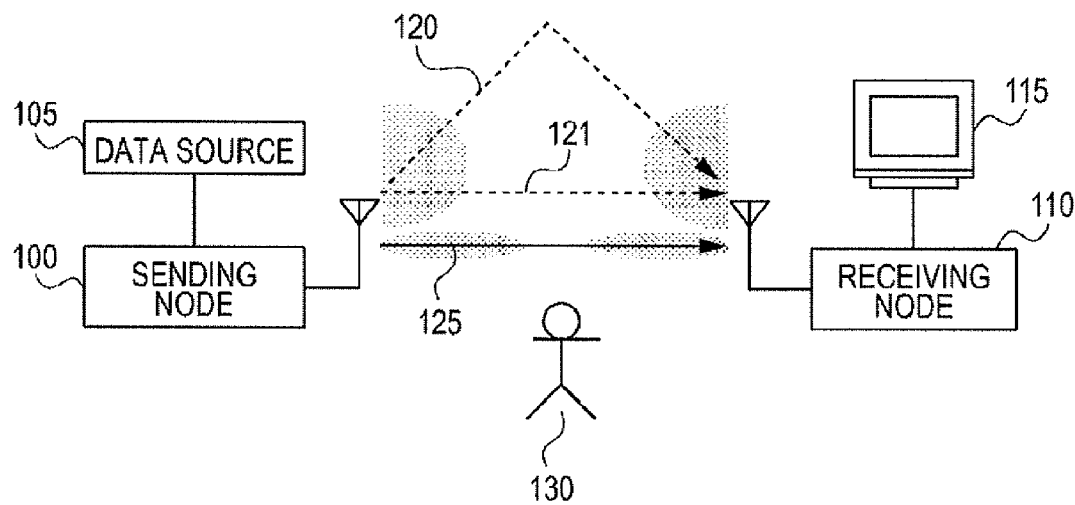
FIG. 1 is a diagram illustrating an example of a configuration of a system.

An embodiment of the present invention will be described with reference to the drawings. FIG. 1 is a diagram illustrating an example of a configuration of a wireless communication system according to the present embodiment. In this system, a video data item is wirelessly transmitted between two nodes. WirelessHD (NPL 1) is utilized as a wireless transmission scheme.

A sending node 100 is a communication apparatus that is a source of sending a video data item. The sending node 100 sends, via a wireless link, a video data item that is obtained from a data source 105. Although the sending node 100 is directly connected to the data source 105 in the configuration, the sending node 100 does not necessarily need to be directly connected to the data source 105. A receiving node 110 is a communication apparatus on a side of destination of the video data item. The receiving node 110 outputs the video data item, which has been received via the wireless link, to a display 115 for displaying a video. The nodes in the present embodiment have directional antennas, and can wirelessly transmit a video data item using a high-rate transmission channel (hereinafter, referred to as an "HRP") and a low-rate transmission channel (hereinafter, referred to as an "LRP") while switching antenna directivities. Reference numerals 120 and 121 denote communication paths for the LRP, and reference numeral 125 denotes a communication path for the HRP. The same video data item is simultaneously sent along the communication paths for the LRP and the communication path for the HRP. Regarding the LRP, a wireless signal is transmitted at a low rate, but transmitted with a wide directivity. Accordingly, a wireless signal propagates over a wide region, and reaches a receiving node via a plurality of communication paths such as the communication paths 120 and 121. Regarding the HRP, a wireless signal is transmitted at a high rate, but transmitted with a narrow directivity. Accordingly, a direction of arrival of a wireless signal associated with communication paths is limited, and a wireless signal reaches a receiving node via a single communication path such as the communication path 125. Reference numeral 130 denotes a shield object that interrupts a communication path.

Figure 2:
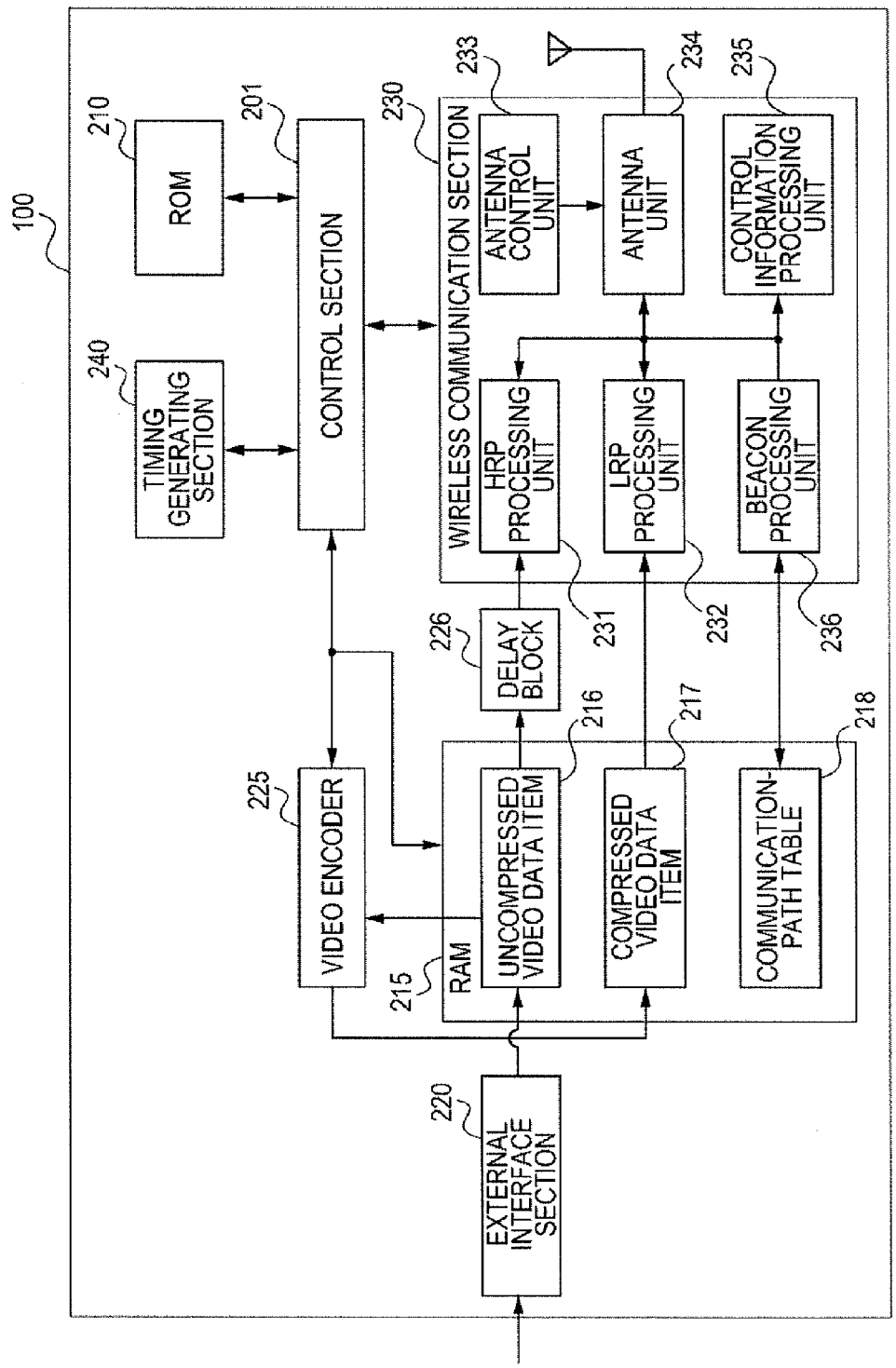
FIG. 2 is a block diagram of a sending node.

FIG. 2 is a block diagram illustrating an internal configuration of the sending node 100. Reference numeral 201 denotes a control section that controls, by executing a control program which is stored in a ROM 210, an overall operation in the sending node 100. Reference numeral 240 denotes a timing generating section for generating a timing at which a process of sending/receiving wireless data items is performed. Reference numeral 210 is a ROM for storing the control program for the sending node 100 and non-volatile parameters. Reference numeral 215 is a RAM for storing volatile parameters and temporary data items. Reference numeral 216 denotes an uncompressed video data item. Reference numeral 217 denotes a compressed video data item. Reference numeral 218 is a communication-path table indicating information items concerning available communication paths for the HRP. All of the reference numerals 216 to 218 denote data items that are saved in the RAM 215. Reference numeral 220 denotes an external interface section for establishing connection to an external device such as a media player, and for receiving a video data item. Reference numeral 225 denotes a video encoder that generates a compressed video data item from an uncompressed video data item. Reference numeral 226 is a delay block that stores a video encoding processing time, and that delays an uncompressed data item, which is to be output, by a predetermined time corresponding to the video encoding processing time. Reference numeral 230 is a wireless communication section that performs sending/receiving of wireless data items. Reference numeral 231 denotes a first communication unit for performing a process of sending/receiving an HRP packet, which is an HRP processing unit. Reference numeral 232 denotes a second communication unit for performing a process of sending/receiving an LRP packet, which is an LRP processing unit. Reference numeral 234 denotes an antenna unit for sending/receiving wireless signals. Reference numeral 233 denotes an antenna control unit for controlling a directional angle of the antenna unit 234. Reference numeral 235 is a control information processing unit for processing control commands and messages defined in a wireless protocol. Reference numeral 236 denotes a beacon processing unit that manages access information items concerning the entire wireless communication system, and that sends the access information items as a beacon. Access information items, such as a unique word for achieving frame synchronization, an identifier of a node that accesses a wireless medium, and a directional angle of an antenna and a modulation class that are applied for a packet to be sent/received by each of the nodes, are included in a beacon. Here, the modulation class indicates a combination of a modulation scheme and an encoding scheme.

Next, the relationships among the individual blocks in a case in which video data items are sent will be described. The sending node 100 receives the uncompressed video data item 216 via the external interface section 220 from an external device. The video encoder 225 encodes the uncompressed video data item 216, thereby generating the compressed video data item 217. The uncompressed video data item 216 and the compressed video data item 217 are passed to the HRP processing unit 231 and the LRP processing unit 232, respectively. In order to guarantee a time difference between a time at which the uncompressed video data item 216 is output and a time at which the compressed video data item is output, the uncompressed video data item 216 is delayed by a delay corresponding to the encoding processing time, and output. The uncompressed video data item 216 is stored in an HRP packet by the HRP processing unit 231, and the compressed video data item 217 is stored in an LRP packet by the LRP processing unit 232. Furthermore, access information items concerning the HRP packet and the LRP packet are generated by the beacon processing unit 236 in accordance with the communication-path table 218, and stored in a beacon. Then, the sending node 100 performs wireless transmission, in accordance with the information items stored in the communication-path table 218, of the beacon, the HRP packet, and the LRP packet while the antenna control unit 233 is controlling the directivity of the antenna unit 234 in accordance with a timing that is generated by the timing generating section 240.

Figure 3:
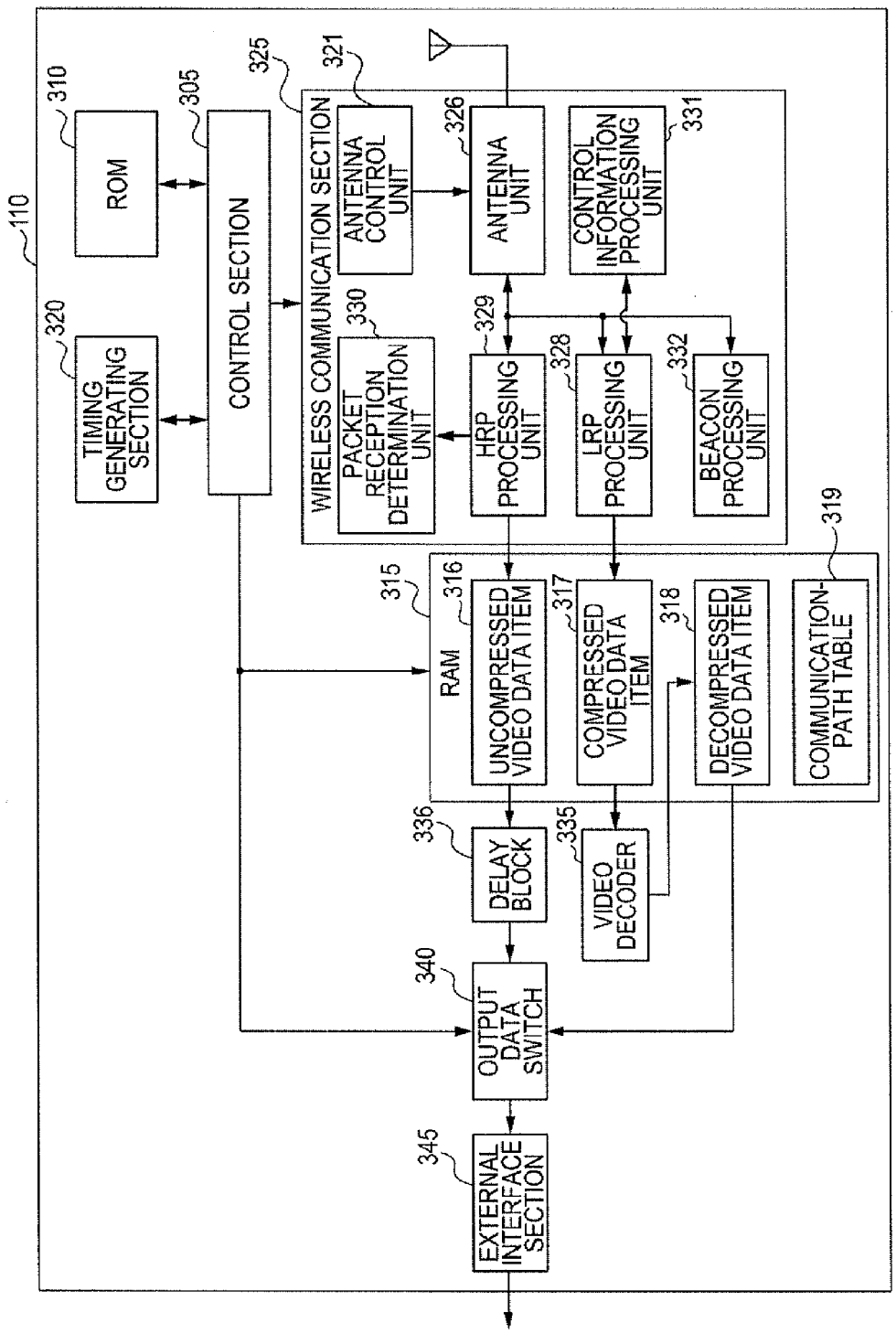
FIG. 3 is a block diagram of a receiving node.

FIG. 3 is a block diagram illustrating an internal configuration of the receiving node 110. Reference numeral 305 denotes a control section that controls, by executing a control program which is stored in a ROM 310, an overall operation in the receiving node 110. Reference numeral 310 is a ROM for storing the control program for the receiving node 110 and non-volatile parameters. Reference numeral 315 is a RAM for storing volatile parameters and temporary data items. Reference numeral 316 is an uncompressed video data item. Reference numeral 317 is a compressed video data item. Reference numeral 318 is a decompressed video data item. Reference numeral 319 is a communication-path table indicating information items concerning available communication paths for the HRP. All of the reference numerals 316 to 319 denote data items that are saved in the RAM 315. Reference numeral 320 denotes a timing generating section for generating a timing at which a process of sending/receiving wireless data items is performed. Reference numeral 325 is a wireless communication section that performs sending/receiving of wireless data items. Reference numeral 326 denotes an antenna unit for sending/receiving wireless signals. Reference numeral 321 denotes an antenna control unit for controlling a directional angle of the antenna unit 326. Reference numeral 329 denotes a first communication unit for performing a process of sending/receiving an HRP packet, which is an HRP processing unit. Reference numeral 328 denotes a second communication unit for performing a process of sending/receiving an LRP packet, which is an LRP processing unit. Reference numeral 330 is a packet reception determination unit that performs determination of whether or not an HRP packet and an LRP packet have been correctly received. Reference numeral 331 is a control information processing unit for processing control commands and control messages defined in a wireless protocol. Reference numeral 332 denotes a beacon processing unit that analyzes and processes access information items included in a received beacon. Reference numeral 335 is a video decoder that decompresses a compressed video data item, thereby generating a decompressed video data item. Reference numeral 336 is a delay block that stores a video decoding processing time, and that delays an uncompressed data item, which is to be output, by a predetermined time corresponding to the video decoding processing time. Reference numeral 340 is an output data switch that performs switching between video data items to be output to an external interface section. Reference numeral 345 denotes an external interface section that is connected to an external device such as a display, and that outputs a video data item.

Next, the relationships among the individual blocks in a case in which video data items are received will be described. The receiving node 110 receives a beacon that has been wirelessly transmitted from the sending node 100. The receiving node 110 receives, in accordance with access information items that are received by the beacon processing unit 332, an HRP packet and an LRP packet while the antenna control unit 321 is controlling the directivity of the antenna unit 326 in accordance with a timing that is generated by the timing generating section 320. Whether the HRP packet and the LRP packet have been received is determined by the packet reception determination unit 330. As a result, when the HRP packet has been correctly received, the uncompressed video data item 316 stored in the HRP packet is extracted, and is saved in the RAM 315. Furthermore, when the LRP packet has been correctly received, the compressed video data item 317 stored in the LRP packet is extracted, and is saved in the RAM 315. When the compressed video data item 317 is received, the compressed video data item 317 is decompressed by the video decoder 335, thereby generating the decompressed video data item 318. The generated decompressed video data item 318 is saved in the RAM 315.

Furthermore, the output data switch 340 determines, in accordance with a result of determination, which is performed by the packet reception determination unit 330, of whether packets have been received, a video data item that is to be output to the external interface section 345. Regarding determination performed by the output data switch 340, when the HRP packet has been correctly received, the uncompressed video data item 316 is output, and when the HRP packet has not been correctly received and the LRP packet has been correctly received, the decompressed video data item 318 that is generated from the compressed video data item 317 is output. When outputting of the uncompressed video data item 316 is performed, in order to guarantee a time difference between a time at which the uncompressed video data item 316 is output and a time at which the decompressed video data item 318 is output, a delay corresponding to the video decoding processing time is inserted by the delay block 336, and the uncompressed video data item 316 is output. The external interface section 345 outputs the uncompressed video data item 316, which has been received, or the decompressed video data item 318 to an external device.

Figure 4:
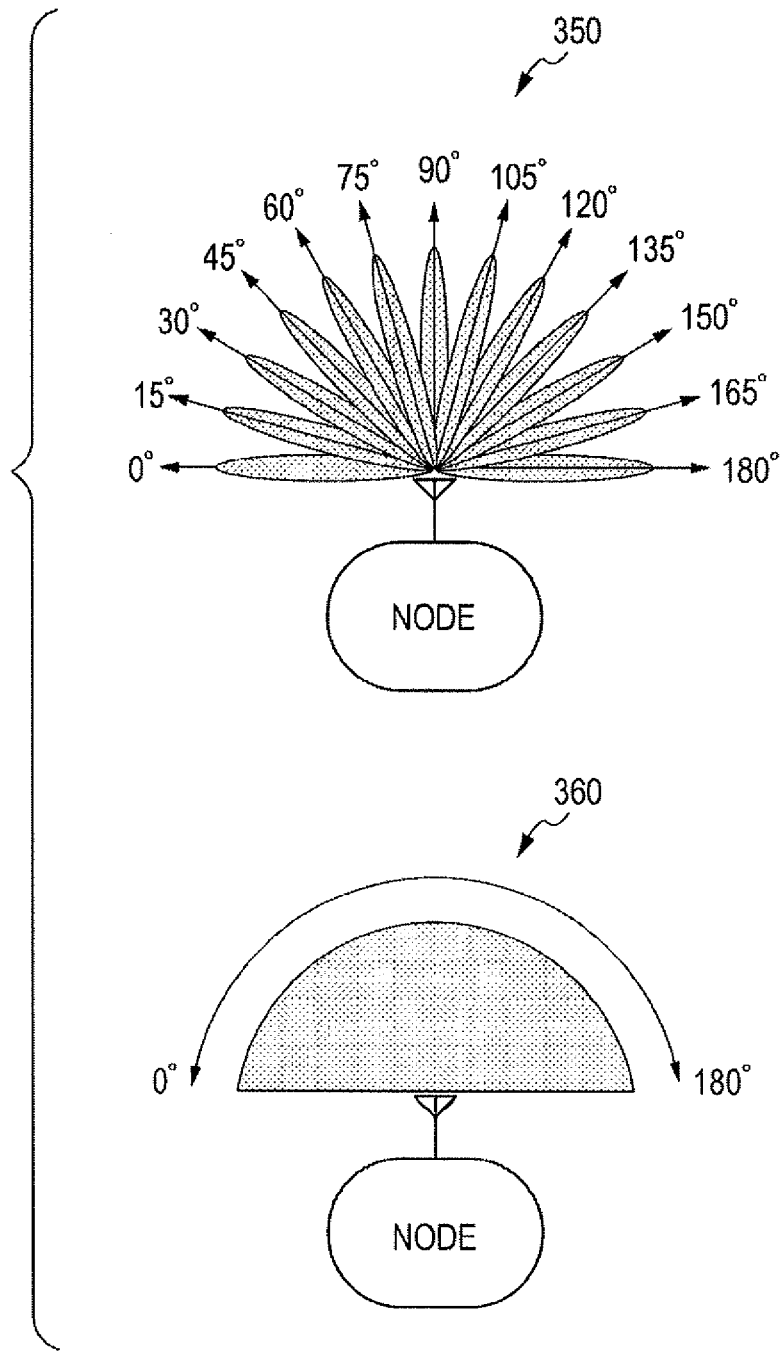
FIG. 4 is a diagram for explaining control of an antenna.

FIG. 4 is a diagram for explaining control of an antenna of each of the nodes. Each of the nodes has an adaptive array antenna, and controls the phase of a wireless signal that is sent/received from an antenna element, whereby a directivity mode can be switched between a narrow-directivity mode 350 and a wide-directivity (Wide) mode 360. In the narrow-directivity mode 350, for example, as illustrated, a directional angle of the antenna is controlled in a range from 0 degrees to 180 degrees with a resolution that is obtained by dividing the range in units of 15 degrees, and a beam can be formed in accordance with the directional angle of the antenna. With the narrow-directivity mode 350, when a wireless signal is sent/received, a high gain can be obtained. However, the range of available communication paths is limited. In this example, the above-mentioned configuration is used for easy understanding. However, the range of the directional angle of the antenna and the resolution of the directional angle of the antenna in the narrow-directivity mode 350 are not limited thereto. In the Wide mode 360, for example, as illustrated, a wide directional angle having a range from 0 degrees to 180 degrees is controlled. However, as in the narrow-directivity mode 350, the range of the directional angle is not limited thereto. When a wireless signal is sent/received, a gain in the Wide mode 360 is lower than that in the narrow-directivity mode 350. However, the range of available communication paths is wider. In this example, at least either one of the sending node and the receiving node performs sending/receiving of an HRP packet in the narrow-directivity mode 350, and performs sending/receiving of an LRP packet whose data capacity is small in the Wide mode 360.

Figure 5:
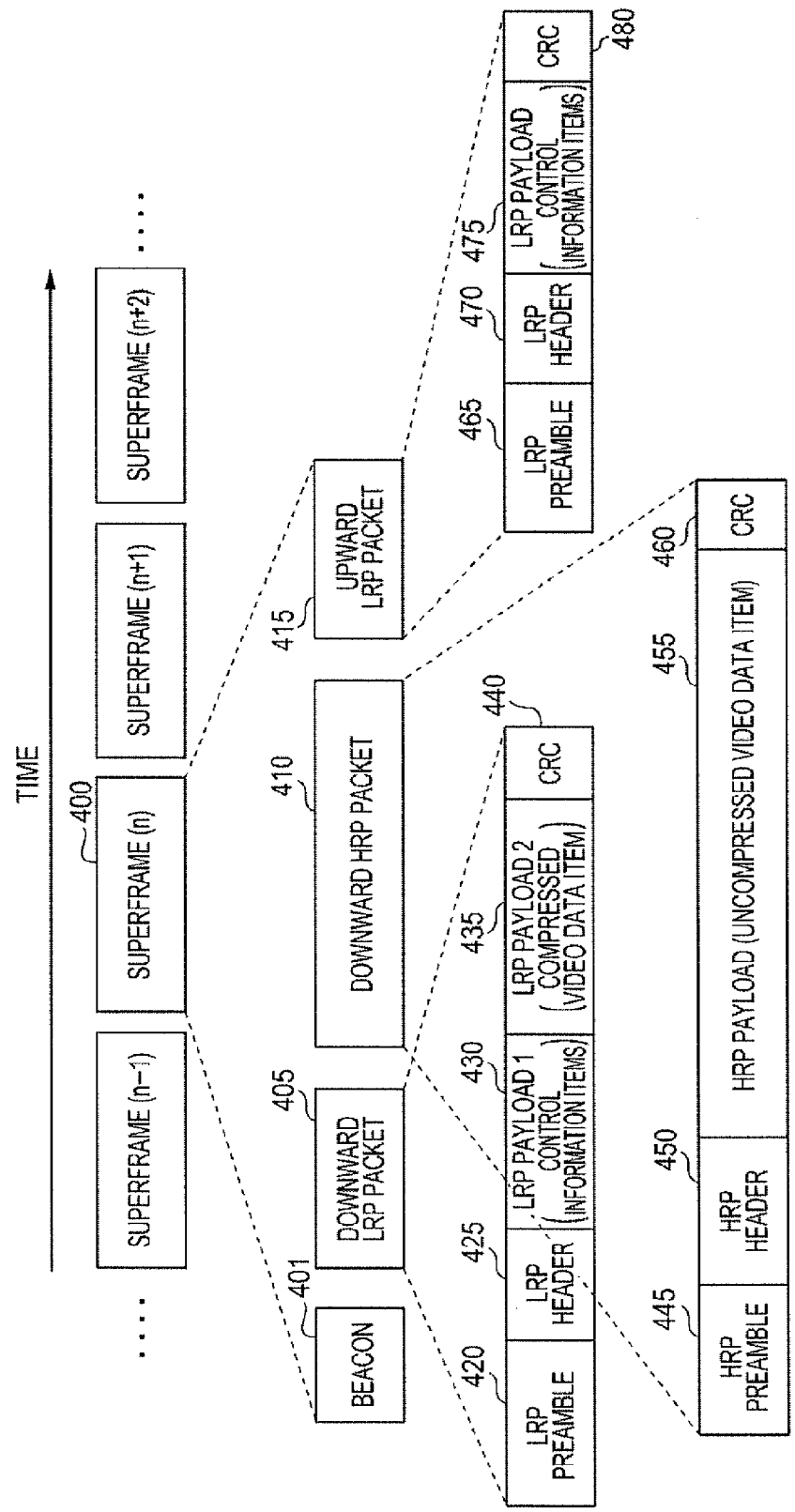
FIG. 5 is a diagram of a configuration of a communication frame.

FIG. 5 is a diagram illustrating a configuration of a superframe 400 that is an example of a communication frame in the wireless communication system according to the present embodiment. The superframe 400 is sent with a certain repeated cycle in a time period in which video data items are available. The superframe 400 includes a beacon 401, a downward LRP packet 405, a downward HRP packet 410, and an upward LRP packet 415. Here, the terms "downward" and "upward" are expressions indicating communication directions between two nodes. A communication direction from the sending node 100 to the receiving node 110 is defined as a "downward" direction, and a communication direction from the receiving node 110 to the sending node 100 is defined as an "upward" direction. The sending node 100 sends the beacon 401, the downward LRP packet 405, and the downward HRP packet 410. With the downward LRP packet 405, the sending node 100 sends control information items and a compressed video data item. With the downward HRP packet 410, the sending node 100 sends an uncompressed video data item. The receiving node 110 sends the upward LRP packet 415, thereby sending control information items. In the present embodiment, because one-way communication of video data items is supposed, an upward HRP packet is not included in the superframe 400. However, in a case of two-way communication, an upward HRP packet is also included in the superframe 400. Furthermore, a method for arranging the packets is not limited thereto. For example, the packets may be arranged so that the upward LRP packet will be a first packet in a sequence of the packets.

Information elements included in each of the packets will be described. Access information items, such as a unique word for achieving frame synchronization, an identifier of a node that accesses a wireless medium, and a directional angle of an antenna and a modulation class that are applied for a packet to be sent/received by each of the nodes, are included in the beacon 401. The receiving node 110 receives the beacon 401, and achieves frame synchronization. In addition, the receiving node 110 receives data packets that have been sent using the LRP and the HRP from the sending node 100 by controlling the directional angle of the antenna and the modulation class in accordance with the access information items included in the beacon 401. The downward LRP packet 405 is a packet with which the sending node 100 sends control information items and a compressed video data item. A known signal for achieving symbol synchronization with respect to a symbol included in the downward LRP packet 405 is included in an LRP preamble 420. Information items concerning the entire downward LRP packet 405, such as the number of payloads included in the downward LRP packet 405 and lengths of the individual payloads, are included in an LRP header 425. Control information items, such as a control command for path switching or for path search and a training sequence in a case of path search, are included in a downward LRP payload 1 (430), if necessary. A compressed video data item is included in an LRP payload 2 (435). A CRC 440 is a sign for detecting an error in the downward LRP packet 405.

The downward HRP packet 410 is a packet with which the sending node 100 sends an uncompressed video data item. A known signal for achieving symbol synchronization with respect to a symbol included in the downward HRP packet 410 is included in an HRP preamble 445. Information items concerning the entire downward HRP packet 410, such as the number of payloads included in the downward HRP packet 410 and lengths of the individual payloads, are included in an HRP header 450. An uncompressed video data item is included in a downward HRP payload 455. A CRC 460 is a sign for detecting an error in the downward HRP packet 410. In the present embodiment, whether, for a video to be replayed, an uncompressed video data item is used or a compressed video data item (a decompressed video data item) is used is determined in accordance with a result of detection of an error in the downward HRP packet 410.

The upward LRP packet 415 is a packet with which the receiving node 110 sends control information items. A known signal for achieving symbol synchronization with respect to a symbol included in the upward LRP packet 415 is included in an LRP preamble 465. Information items concerning the entire upward LRP packet 415, such as the number of payloads included in the upward LRP packet 415 and lengths of the individual payloads, are included in an LRP header 470. Control information items, such as a control command for path switching or for path search and the training sequence in a case of path search, are included in an upward LRP payload 475. A CRC 480 is a sign for detecting an error in the upward LRP packet 415.

Figure 6:
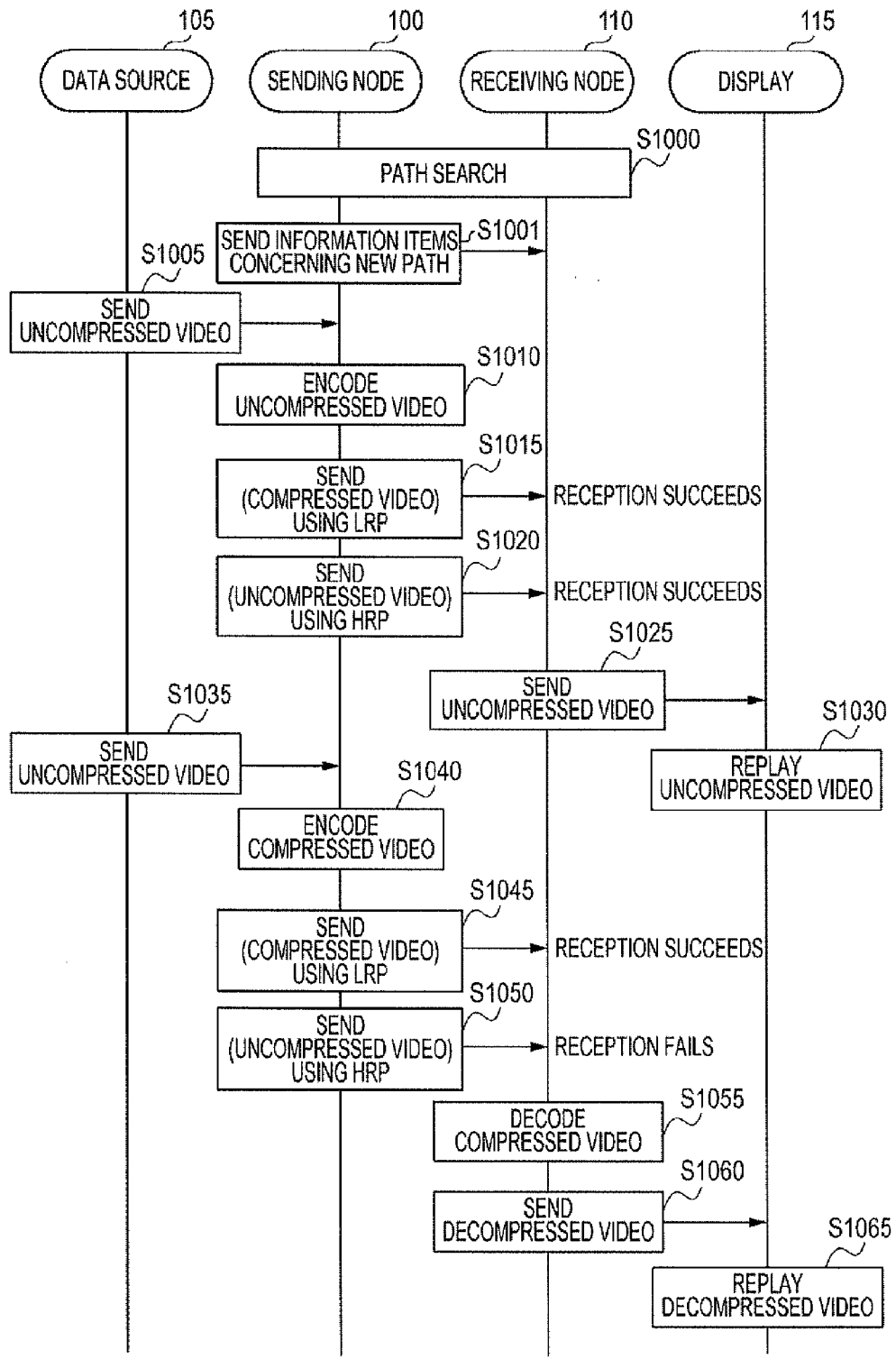
FIG. 6 is a sequence diagram of an overall operation of the system.

FIG. 6 is a diagram for explaining an operation of controlling the system. Prior to transmission of video data items, in order to search a communication path that is most appropriate for the HRP, the sending node 100 and the receiving node 110 perform a path search process S1000. In the path search process, measurement of communication qualities for directional angles of each of a sending antenna and a receiving antenna is performed using control commands for the LRP and the training sequence. Communication paths that are available for transmission of video data items are listed in accordance with results of measurement of the communication qualities. The listed available communication paths are saved as each of the communication-path tables 218 and 319 in a corresponding one of the RAMs 215 and 315. Then, the most appropriate communication path is selected from the communication-path tables 218 and 319. Access information items, such as the directional angle of the sending antenna of the sending node 100, the directional angle of the receiving antenna of the receiving node 110, and a modulation class for an HRP packet, are determined. The determined access information items concerning the new communication path is shared, using the beacon 401, between the sending node 100 and the receiving node 110 (S1001).

Next, the sending node 100 and the receiving node 110 perform transmission of video data items. In a sequence from S1005 to S1030, a process performed in a case in which the receiving node 110 correctly receives an HRP packet and an LRP packet is illustrated. A data source sends an uncompressed video data item to the sending node 100 (S1005). The sending node 100 encodes the uncompressed video data item that has been received, thereby generating a compressed video data item (S1010). The sending node 100 sends the compressed video data item using the LRP (S1015). Furthermore, the sending node 100 sends the uncompressed video data item using the HRP (S1020). Because the receiving node 110 succeeds in reception of both the LRP packet and the HRP packet, the receiving node 110 outputs the uncompressed video data item to the display (S1025). The display that has received the video data item replays the uncompressed video data item (S1030).

In a sequence from S1035 to S1065, a process performed in a case in which the receiving node 110 cannot correctly receive an HRP packet is illustrated. Processes in S1035 to S1050 are the same as the processes in S1005 to S1020. In this sequence, the receiving node 110 succeeds in reception of an LRP packet, but fails to receive an HRP packet. Accordingly, the receiving node 110 decodes a compressed video data item, thereby generating a decompressed video data item (S1055). Then, the receiving node 110 outputs the decompressed video data item to the display (S1060). The display that has received the decompressed video data item replays the decompressed video data item (S1065). With the above sequence, even when the receiving node 110 cannot correctly receive an uncompressed video data item transmitted using the HRP, by utilizing a compressed video data item that is simultaneously transmitted using the LRP, a video can be replayed without being interrupted.

Figure 7:
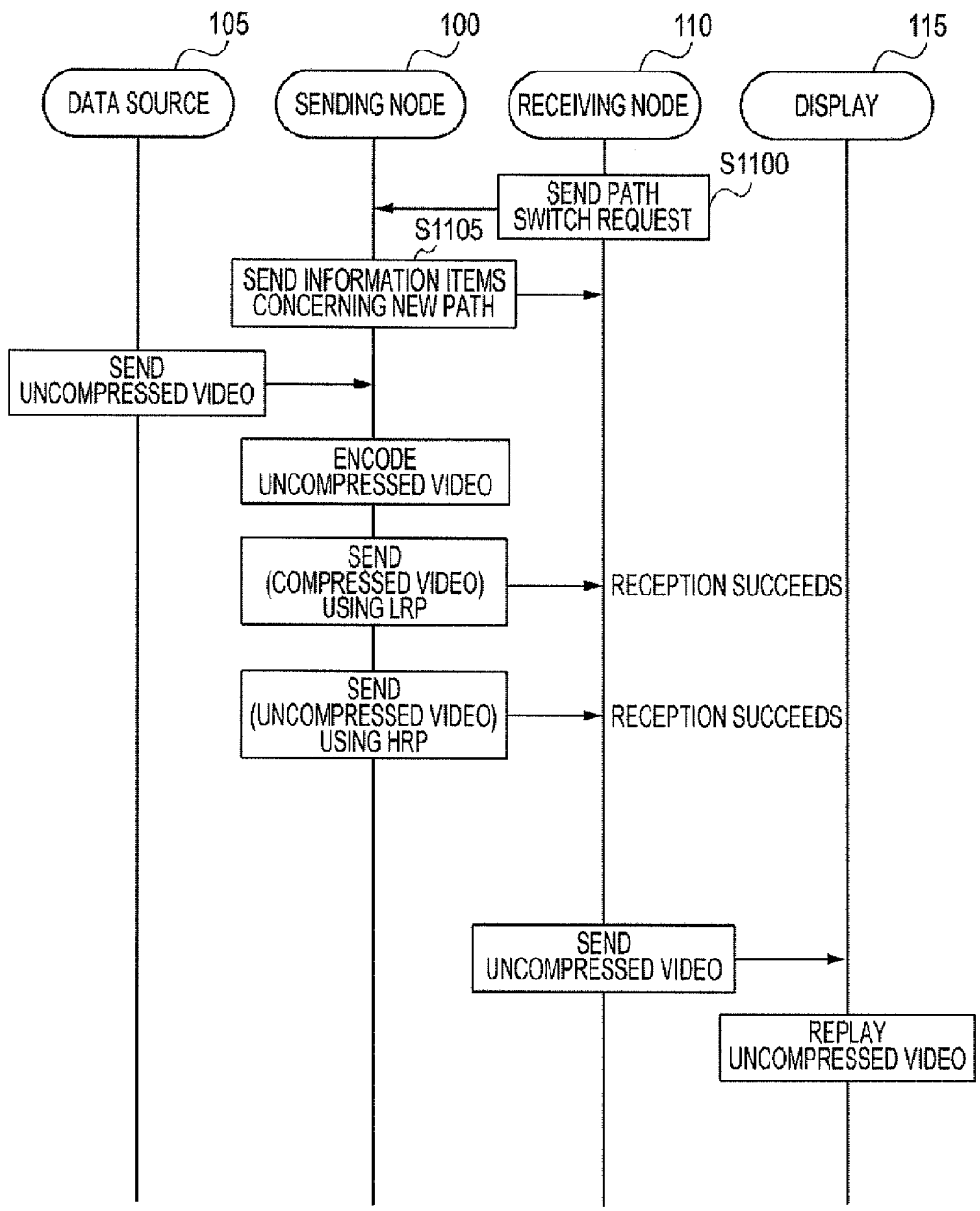
FIG. 7 is a sequence diagram in a case in which a path switching process is activated.

Next, an example of a path switching process performed in a case in which an HRP-packet reception error is detected will be described with reference to a sequence diagram illustrated in FIG. 7. Here, the path switching process is a process of performing, in accordance with a result of path search, switching to a communication path that is different from the currently used communication path. When a state in which replaying of a compressed video data item received using the LRP is performed has continued for a fixed time period because an uncompressed video data item has not been correctly received using the HRP, the path switching process is performed in order to perform switching among communication paths for the HRP. Switching among communication paths for the HRP is performed, and replaying of an uncompressed video data item received using a communication path for the HRP that has been newly selected by the path switching process can be resumed.

When the receiving node 110 continuously detects the HRP-packet reception error for a predetermined time period, the receiving node 110 determines that switching to another communication path should be performed. The receiving node 110 specifies a desired communication path, and sends a path switch request to the sending node 100 (S1100). The sending node 100 that has received the path switch request determines access information items, such as the directional angle of the sending antenna of the sending node 100 for the specified new communication path, the directional angle of the receiving antenna of the receiving node 110, and a modulation class for an HRP packet, are determined. The determined access information items are shared, using the beacon 401, between the sending node 100 and the receiving node 110 (S1105). After the path switching process has been performed, transmission of an uncompressed video data item using the HRP is performed using the new communication path. With the above sequence, from a state in which replaying of a compressed video data item received using the LRP is performed because an uncompressed video data item has not been correctly received using the HRP, switching among communication paths for the HRP can be performed, and replaying of an uncompressed video data item received using the HRP can be performed again. Note that, although a configuration in which the receiving node 110 issues a trigger for path switching is used in the present embodiment, the configuration is not limited thereto. A configuration in which the sending node 100 issues the trigger may be used.

Figure 8:
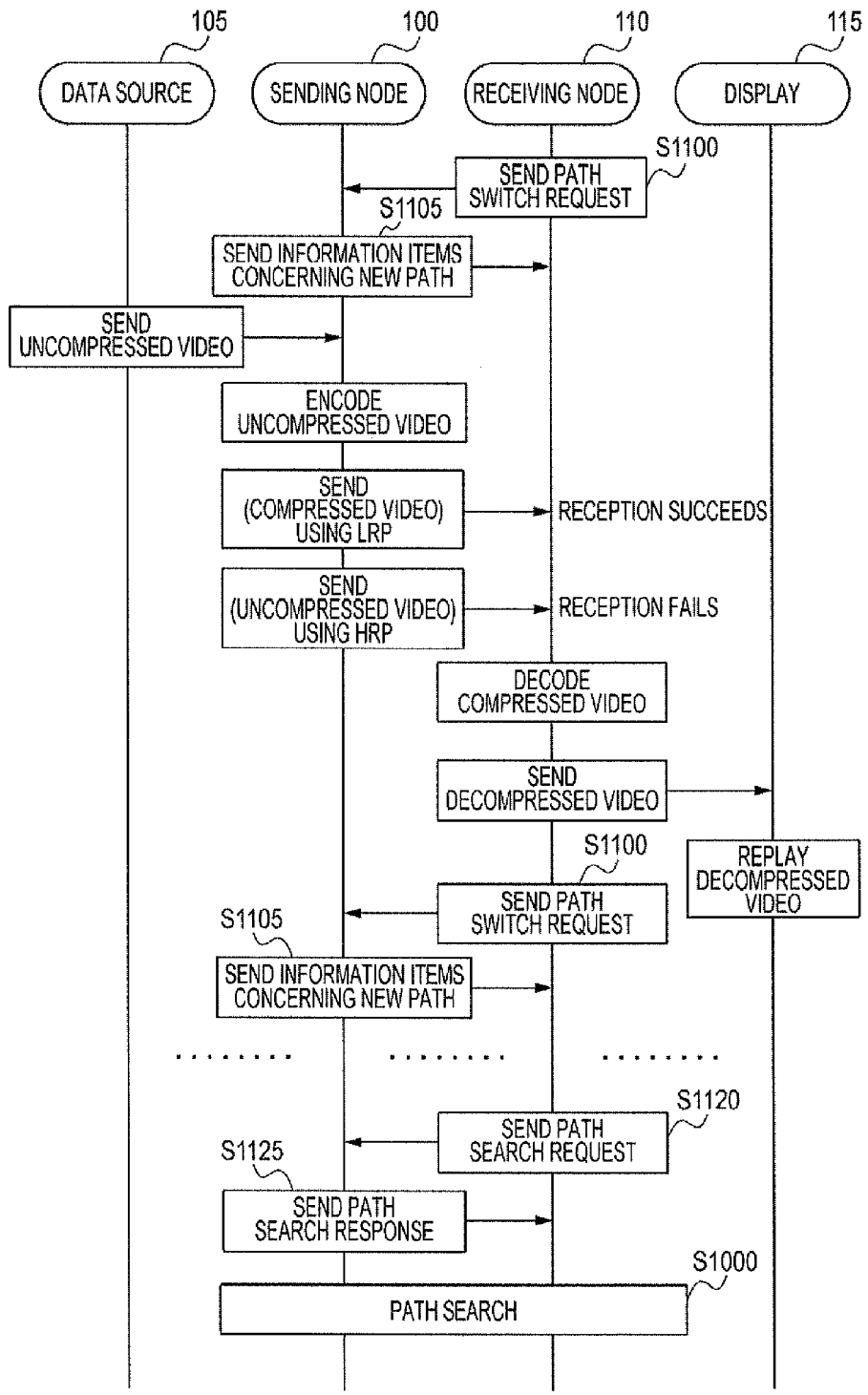
FIG. 8 is a sequence diagram in a case in which a path search process is activated.

Next, an example of a path search process performed in a case in which the HRP-packet reception error is detected will be described with reference to a sequence diagram illustrated in FIG. 8. When the receiving node 110 continuously detects the HRP-packet reception error for a predetermined time period, the receiving node 110 performs a procedure of S1100 and S1105, whereby performing switching between communication paths. In a case in which the HRP-packet reception error is continuously detected although switching between communication paths has been performed, switching to another communication path is performed until reception of the video data item using the HRP succeeds. When transmission of an HRP packet has been performed using all available communication paths and reception of the HRP packet still fails, the receiving node 110 sends a path search request (S1120). The sending node 100 that has received the path search request sends a path search response (S1125). The sending node 100 and the receiving node 110 perform the path search process again (S1000), thereby performing search of a new available communication path. With the above sequence, even when no available communication path for the HRP is found, path search can be performed again without stopping video replay. Note that, although a configuration in which the receiving node 110 issues a trigger for the path search process in the present embodiment, the configuration is not limited thereto. A configuration in which the sending node 100 issues the trigger may be used.

Figure 9:
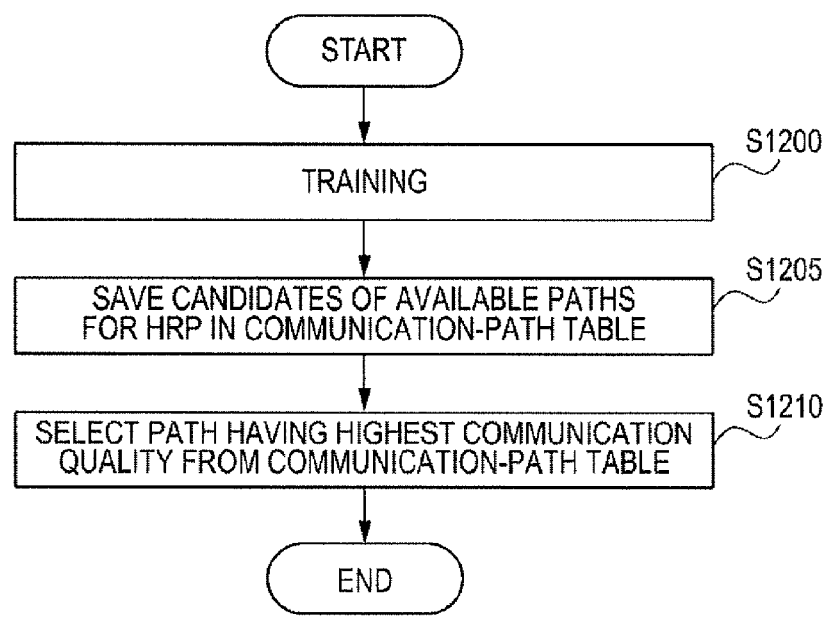
FIG. 9 is a flowchart of the path search process.

FIG. 9 is a flowchart illustrating an operation of the path search process that is performed by the sending node 100 and the receiving node 110. The path search process is a process of searching for a new communication path that is available for transmission using the HRP. First, the sending node 100 and the receiving node 110 perform a training process (S1200), thereby measuring communication qualities for directional angles of each of the sending antenna and the receiving antenna. In the training process (S1200), a process in which either one of the sending node 100 and the receiving node 110 sends the training sequence using a predetermined directional angle of the corresponding antenna, and in which the other node measures a communication quality in a case in which the other node receives the training sequence using a predetermined directional angle of the corresponding antenna is repeated times corresponding to combinations of all of the directional angles of the antennas. Note that, when it is considered that a video data item is to be sent from the sending node 100 to the receiving node 110, preferably, the sending node 100 sends the training sequence using a predetermined directional angle of the corresponding antenna, and the receiving node 110 measures a communication quality in a case in which the receiving node 110 receives the training sequence using a predetermined directional angle of the corresponding antenna. As an indicator indicating a communication quality, typically, an RSSI (a reception field strength), a CINR (a ratio of a carrier-wave power to an interference noise power), or the like is used. RSSI stands for Received Signal Strength Indicator. CINR stands for Carrier to Interface and Noise Ratio. As a result of the training process, information items concerning communication paths that satisfy a predetermined communication quality are saved as available communication paths for the HRP in the communication-path tables 218 and 319 (S1205). Then, a communication path having a highest communication quality is selected from the communication-path tables 218 and 319 (S1210).

The communication-path tables 218 and 319 are tables that are generated as a result of performance of the path search process, and that indicate a list of communication paths which are available for transmission using the HRP (referring to FIG. 10). In this example, for each of the available communication paths, a path number 500, an RSSI level 505, a directional angle 510 of a sending antenna, a directional angle 515 of a receiving antenna, a modulation scheme 520, and an encoding rate 525 are saved in the tables. The path number 500 is used to identify a communication path, and used to specify the currently used communication path and a communication path when path switching is performed, and so forth. The RSSI level 505 is a level of a communication quality of a communication path, and a higher RSSI level of a communication path indicates that the communication quality of the communication path is higher. In this example, communication paths are sorted in descending order of the RSSI levels. The directional angle 510 of a sending antenna is a directional angle of the antenna of the sending node 100 in a case in which a communication path is used. The directional angle 515 of a receiving antenna is a directional angle of the antenna of the receiving node 110. The modulation scheme 520 and the encoding rate 525 indicate a modulation class that should be applied for a communication path which is determined as an appropriate communication path on the basis of the RSSI level 505. The sending node 100 and the receiving node 110 perform control of an operation of sending/receiving a video data item in accordance with an information item concerning a communication path that is selected from the communication-path table. Note that the communication-path table illustrated in FIG. 10 is an example of information that is referred to when selection of a communication path for the HRP is performed. A configuration for information that is referred to when selection of a communication path is performed is not limited to the above-described configuration.

Figure 11A:
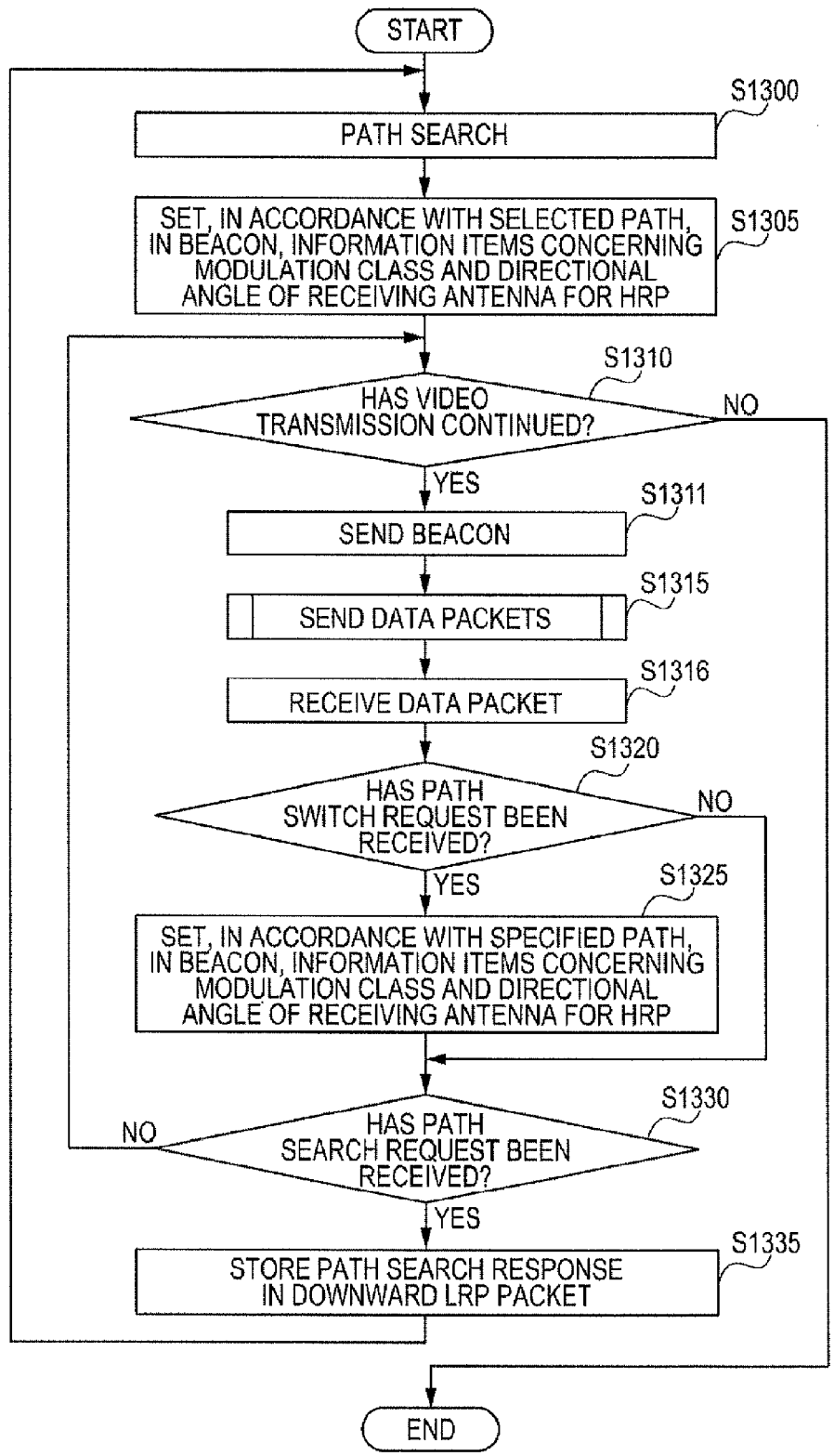
FIG. 11A is a flowchart of a process performed by the sending node.

FIGS. 11A and B are flowcharts illustrating an internal operation of the sending node 100. The operation illustrated in FIGS. 11A and B is performed by executing, with the control section 201, the control program that is stored in the ROM 210.

Hereinafter, each step in the flowchart illustrating the overall operation of the sending node 100, which is illustrated in FIG. 11A, will be described. The sending node 100, together with the receiving node 110, performs the path search process, thereby selecting a communication path that is most appropriate for transmission using the HRP (S1300). Information items concerning a modulation class for an HRP packet and a directional angle of the receiving antenna that are determined for a communication path, which have been selected from the communication-path table, are stored in the beacon 401 (S1305). The receiving node 110 performs, in accordance with the information items, setting of the directional angle of the receiving antenna for the HRP and demodulation.

The sending node 100 determines whether or not video transmission from the data source 105 continues (S1310).

When video transmission from the data source 105 continues, the process branches to S1311. When video transmission from the data source 105 does not continue, the process is terminated. In S1311, the sending node 100 sends the beacon 401. It is supposed that the beacon 401 is sent using a known modulation class in the Wide mode. The sending node 100 sends data packets including an uncompressed video data item and a compressed video data item while performing control of the antenna directivity (S1315). The sending node 100 sets the antenna to be in the Wide mode, and receives control information items that are included in an upward LRP packet (S1316). The sending node 100 analyzes the received control information items, and determines whether or not the sending node 100 has received the path switch request from the receiving node 110 (S1320). When it is determined that the sending node 100 has received the path switch request from the receiving node 110, the process branches to S1325. Otherwise, the process branches to S1330. In S1325, the sending node 100 performs switching to a communication path that is specified in the path switch request by the receiving node 110, and uses the communication path as a new communication path for the HRP. Then, the sending node 100 obtains, from the communication-path table, information items concerning a modulation class and a directional angle of the receiving antenna that are determined for the specified communication path, and stores the information items in the beacon 401. In S1330, the sending node 100 analyzes the control information items that have been received from the receiving node 110, and determines whether or not the sending node 100 has received the path search request from the receiving node 110. When it is determined that the sending node 100 has received the path search request, the process branches to S1335. Otherwise, the process branches to S1310. In S1335, the sending node 100 stores a control command for the path search response in a control information item included in a downward LRP packet, and sends the downward LRP packet. After that, the process branches to S1300, and the sending node 100 performs the path search process.

Figure 11B:
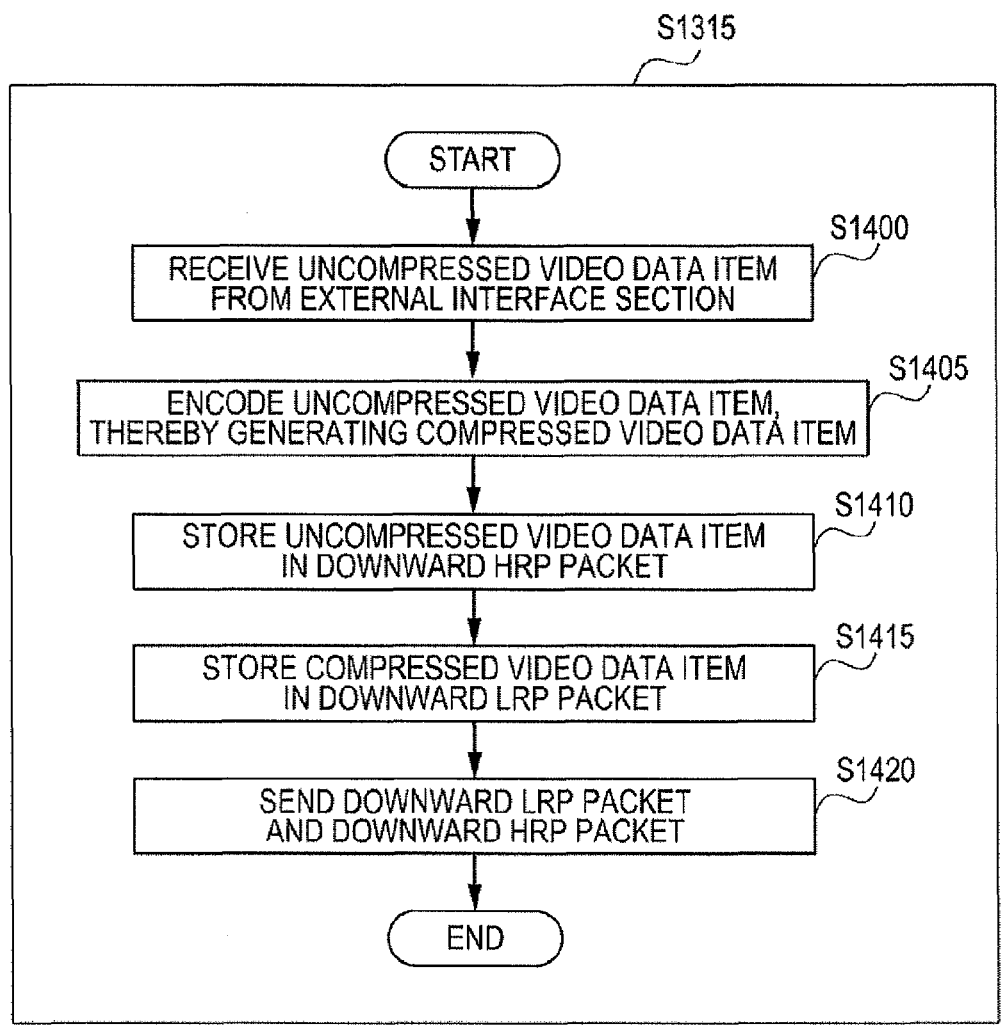
FIG. 11B is a flowchart of the process performed by the sending node.

Next, a process of sending data packets (S1315) illustrated in FIG. 11A will be described with reference to FIG. 11B. The sending node 100 receives an uncompressed video data item via the external interface section 220 from the data source 105 (S1400). The sending node 100 encodes, using the video encoder 225, the uncompressed video data item, thereby generating a compressed video data item (S1405). The sending node 100 stores the uncompressed video data item in a downward HRP packet (S1410). Furthermore, the sending node 100 stores the compressed video data item in a downward LRP packet (S1415). The sending node 100 performs a process of sending the downward LRP packet and the downward HRP packet while performing control of the antenna directivity in accordance with a timing that is generated by the timing generating section 240 (S1420). In the process of sending the downward LRP packet and the downward HRP packet, first, the sending node 100 sets the antenna to be in the Wide mode, and sends the downward LRP packet 405 using the modulation class that is specified in the beacon 401. Next, the sending node 100 sets the antenna to be in the narrow-directivity mode, sets the directional angle of the antenna that is specified in the beacon 401, and sends the downward HRP packet 410 using the predetermined modulation class.

Figure 12A:
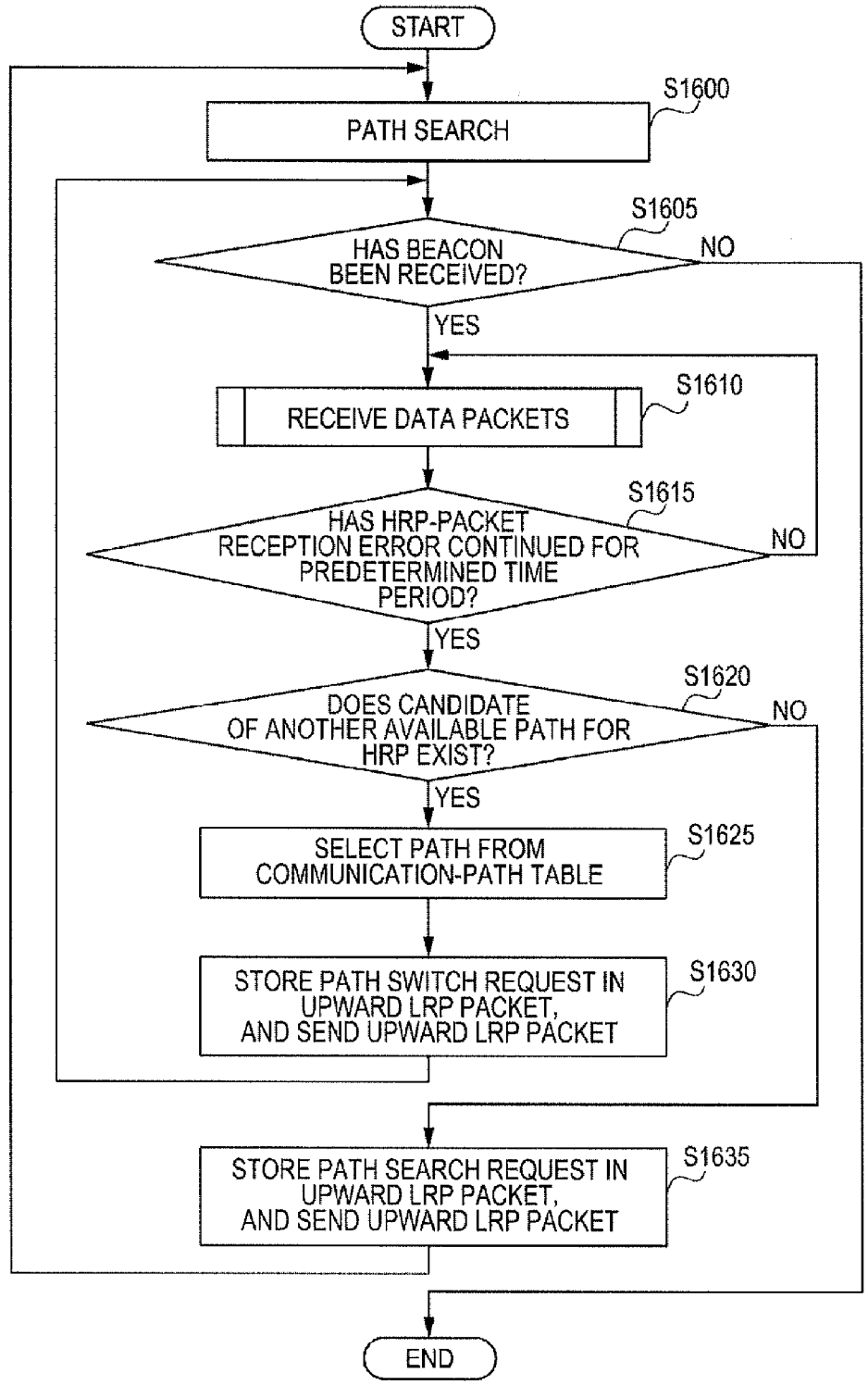
FIG. 12A is a flowchart of a process performed by the receiving node.
Figure 12B:
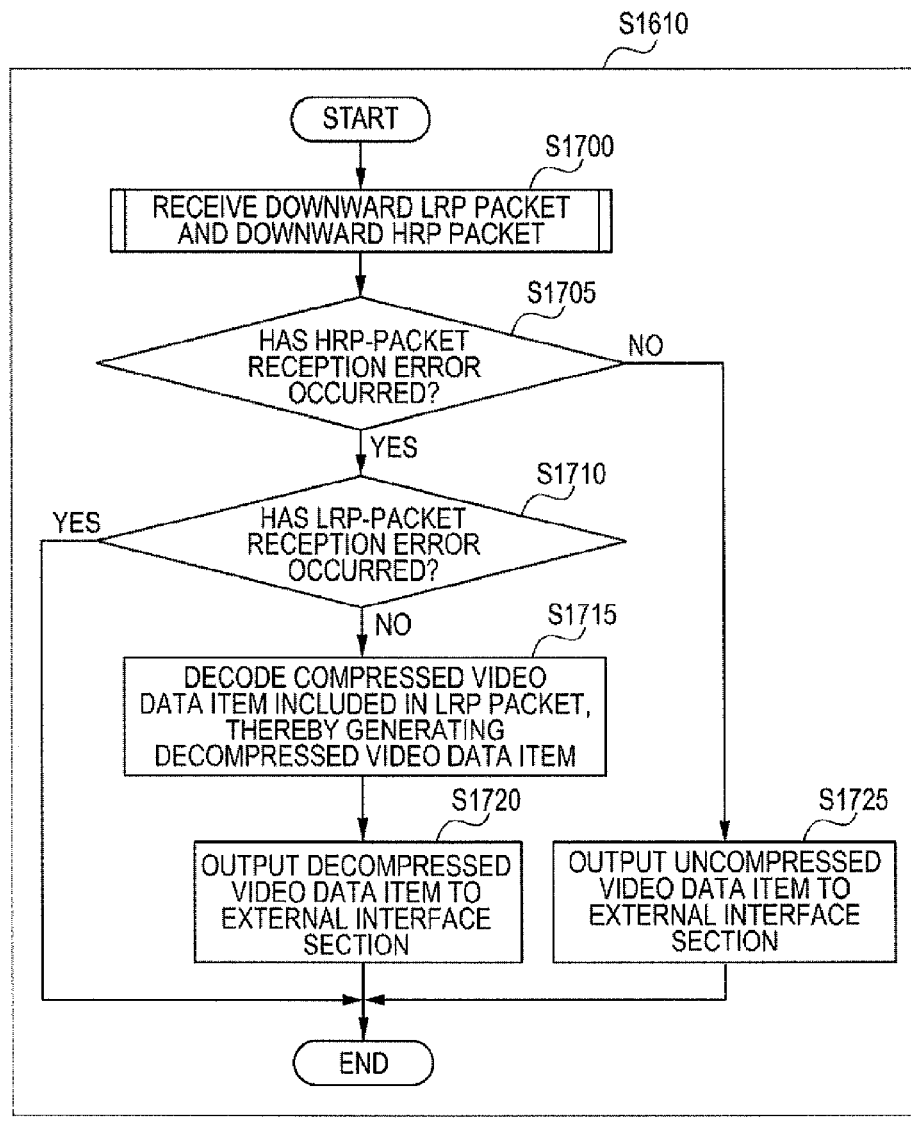
FIG. 12B is a flowchart of the process performed by the receiving node.

FIGS. 12A and 12B are flowcharts illustrating an internal operation of the receiving node 110. The operation illustrated in FIGS. 12A and 12B is performed by executing, with the control section 305, the control program that is stored in the ROM 310.

Hereinafter, each step in the flowchart of the overall operation of the receiving node 110, which is illustrated in FIG. 12A, will be described. The receiving node 110, together with the sending node 100, performs the path search process, thereby selecting a communication path that is most appropriate for transmission using the HRP (S1600). The receiving node 110 determines whether or not the receiving node 110 has received the beacon 401 (S1605). When the receiving node 110 has received the beacon 401, the process branches to S1610. Otherwise, the process is terminated. Note that, in the present embodiment, it is supposed that the beacon 401 is received using a known modulation class in the Wide mode. When the receiving node 110 has received the beacon 401, the receiving node 110 performs control of the antenna directivity in accordance with a timing that is generated by the timing generating section 320, and receives data packets including video data items (S1610). When the receiving node 110 receives data packets, the receiving node 110 determines a state of reception of an HRP packet, and determines whether or not the HRP-packet reception error has continued for a predetermined time period (S1615). As a result of determination, when the receiving node 110 determines that the HRP-packet reception error has continued for the predetermined time period, the process branches to S1620. Otherwise, the process branches to S1610, and the receiving node 110 attempts to receive the data packets again. In S1620, because the HRP-packet reception error has continued for the predetermined time period, the receiving node 110 determines that switching to another communication path should be performed, and the receiving node 110 determines, by referring to the communication-path table, whether or not a candidate of another available communication path exists. As a result of determination, when a candidate of an available communication path exists, the process branches to S1625. When a candidate of an available communication path does not exist, the process branches to S1635. In S1625, the receiving node 110 selects another available communication path from the communication-path table. Then, the receiving node 110 stores a control command for the path switch request in a control information item included in an upward LRP packet, and sends the upward LRP packet (S1630). In the path switch request, an information item specifying the communication path that has been selected in S1625 is included. In S1635, the receiving node 110 stores a control command for the path search request in a control information item included in an upward LRP packet, and sends the upward LRP packet. Then, the process returns to S1600, and the receiving node 110, together with the sending node 100, performs path search again.

Next, a process of receiving data packets (S1610) illustrated in FIG. 12A will be described with reference to FIG. 12B. The receiving node 110 performs control of the antenna directivity in accordance with a timing that is generated by the timing generating section 320, and performs a process of receiving a downward LRP packet and a downward HRP packet that include video data items (S1700). First, the receiving node 110 sets the antenna to be in the Wide mode, and receives the downward LRP packet 405 using the modulation class that is specified in the beacon 401. Next, the receiving node 110 sets the antenna to be in the narrow-directivity mode, sets the antenna to be at a directional angle of the antenna that is specified in the beacon 401, and receives the downward HRP packet 410 using the predetermined modulation class. Then, the receiving node 110 determines a state of reception of the downward HRP packet, thereby determining whether or not the downward HRP packet has been correctly received (S1705). As a result of determination, when the downward HRP packet has been correctly received, the receiving node 110 outputs a received uncompressed video data item to the external interface section 345 that is connected to the display. When the downward HRP packet has not been correctly received, the receiving node 110 determines whether or not the downward LRP packet has been correctly received (S1710). As a result of determination, when the downward LRP packet has been correctly received, the receiving node 110 decompresses, using the video decoder 335, a compressed video data item that is stored in the downward LRP packet, thereby generating a decompressed video data item (S1715). Then, the receiving node 110 outputs the decompressed video data item to the external interface section 345 that is connected to the display (S1720). When the downward LRP packet has not been correctly received, i.e., when both the downward HRP packet and the downward LRP packet have errors and have not been correctly received, the process is terminated.

Note that, although communication paths that are different from each other are applied for the HRP and the LRP by applying antenna directivities that are different each other in the present embodiment, the present invention is not limited thereto. For example, a configuration may be used, in which, without performing control of the antenna directivities, a difference between the characteristics of communication paths are generated simply by applying modulation classes that are different from each other for the HRP and the LRP. Furthermore, in the present embodiment, a configuration may be used, in which, in communication using the HRP and the LRP, multiplexing is performed by one of time division multiplexing, frequency division multiplexing, code division multiplexing, and space division multiplexing. Furthermore, although a video data item is used as an example in the above-described embodiment, any of an audio data item and other data items may be used. Particularly, the present invention is effective to data transmission that requires a real-time property.

As described above, the same data item is simultaneously transmitted using the high-rate transmission channel and the low-rate transmission channel, and, in a normal case, the data item transmitted using the high-rate transmission channel is utilized. However, when the high-rate transmission channel is interrupted, the data item transmitted using the low-rate transmission channel is utilized. Therefore, even when the high-rate transmission channel is interrupted, short interruption of replaying of the data item can be reduced. Furthermore, when search of a new communication path is necessary because of interruption of the high-rate transmission channel, stopping of replaying of the data item can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-059561, filed Mar. 12, 2009, which is hereby incorporated by reference herein in its entirety.

The invention claimed is:

1. A communication apparatus comprising:
 a first communication unit configured to receive predetermined data via a high-rate transmission channel having narrow directivity;
 a second communication unit configured to receive, via a low-rate transmission channel having wide directivity, compressed data that is obtained by compressing the predetermined data; and
 an output unit configured to, in a case where an error occurs in reception of the predetermined data, decompress the received compressed data and output decompressed data, and in a case where an error does not occur in reception of the predetermined data, output the received predetermined data without using the received compressed data.

2. The communication apparatus according to claim 1, further comprising:
 a determination unit configured to determine an error of reception using the high-rate transmission channel; and
 a selection unit configured to select, in accordance with a result of determination by the determination unit, the predetermined data that has been received using the high-rate transmission channel or the compressed data that has been received using the low-rate transmission channel.

3. The communication apparatus according to claim 2,
 wherein the determination unit determines the error of reception using the high-rate transmission channel and a state of reception using the low-rate transmission channel, and
 wherein, when the predetermined data has not been received using the high-rate transmission channel and the compressed data has been received using the low-rate transmission channel, the selection unit selects the compressed data received using the low-rate transmission channel.

4. The communication apparatus according to claim 1, wherein the communication apparatus communicates an uncompressed data using the high-rate transmission channel, and communicates compressed data using the low-rate transmission channel.

5. The communication apparatus according to claim 1, wherein communication paths different from each other are applied for the high-rate transmission channel and the low-rate transmission channel.

6. The communication apparatus according to claim 1, wherein the high-rate transmission channel and the low-rate transmission channel communicate using directional angles, which are different from each other, of antennas.

7. The communication apparatus according to claim 1,
 wherein the output unit delays the predetermined data, which has been received using the high-rate transmission channel, by a predetermined time, and outputs the predetermined data.

8. The communication apparatus according to claim 1, wherein the first communication unit delays the predetermined data by a predetermined time, and sends the predetermined data.

9. The communication apparatus according to claim 1, wherein the predetermined data is video data.

10. A method for controlling a communication apparatus, the method comprising:
 a processor for receiving predetermined data via a high-rate transmission channel having narrow directivity;
 the processor for receiving, via a low-rate transmission channel having wide directivity, compressed data that is obtained by compressing the predetermined data; and
 in a case where an error occurs in reception of the predetermined data, decompress the received compressed data and output decompressed data, and in a case where an error does not occur in reception of the predetermined data, output the received predetermined data without using the received compressed data.

11. A non-transitory computer readable medium storing control program causing a communication apparatus to execute a method for controlling the communication apparatus, the method comprising:
- receiving, predetermined data via a high-rate transmission channel having narrow directivity;
- receiving, via the high-rate transmission channel being performed, also via a low-rate transmission channel having wide directivity, compressed data that is obtained by compressing the predetermined data; and
- in a case where an error occurs in reception of the predetermined data, decompress the received compressed data and output decompressed data, and in a case where an error does not occur in reception of the predetermined data, output the received predetermined data without using the received compressed data.

* * * * *